(12) United States Patent
Fischer

(10) Patent No.: US 8,589,540 B2
(45) Date of Patent: Nov. 19, 2013

(54) SYSTEM, METHOD AND COMPUTER PROGRAM PRODUCT FOR DETERMINING A RATE AT WHICH AN ENTITY IS POLLED

(75) Inventor: Ronald F. Fischer, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 130 days.

(21) Appl. No.: 13/102,995

(22) Filed: May 6, 2011

(65) Prior Publication Data

US 2011/0302299 A1 Dec. 8, 2011

Related U.S. Application Data

(60) Provisional application No. 61/352,267, filed on Jun. 7, 2010.

(51) Int. Cl.
*G06F 15/173* (2006.01)

(52) U.S. Cl.
USPC .......................................... 709/224; 709/223

(58) Field of Classification Search
USPC ................................. 709/224, 223
See application file for complete search history.

(56) References Cited

U.S. PATENT DOCUMENTS

| | | | |
|---|---|---|---|
| 7,209,929 B2 | 4/2007 | Dominguez, Jr. et al. | |
| 7,698,160 B2 | 4/2010 | Beaven et al. | |
| 7,734,380 B2* | 6/2010 | Ransom et al. | 700/286 |
| 7,877,522 B2* | 1/2011 | Nochimowski et al. | 710/15 |
| 8,015,249 B2* | 9/2011 | Nayak et al. | 709/206 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0046586 A1* | 3/2003 | Bheemarasetti et al. | 713/201 |
| 2003/0233404 A1 | 12/2003 | Hopkins | |
| 2004/0153506 A1* | 8/2004 | Ito et al. | 709/204 |
| 2005/0065925 A1 | 3/2005 | Weissman et al. | |
| 2005/0149932 A1* | 7/2005 | Hasink et al. | 718/100 |
| 2005/0223022 A1 | 10/2005 | Weissman et al. | |
| 2005/0283478 A1 | 12/2005 | Choi et al. | |
| 2006/0129673 A1* | 6/2006 | Majumdar et al. | 709/224 |
| 2006/0143646 A1* | 6/2006 | Wu et al. | 725/10 |
| 2006/0206834 A1 | 9/2006 | Fisher et al. | |
| 2007/0067455 A1* | 3/2007 | Gursky et al. | 709/225 |
| 2010/0115050 A1* | 5/2010 | Sultenfuss et al. | 709/217 |

OTHER PUBLICATIONS

U.S. Appl. No. 60/828,192, filed Oct. 4, 2006.

* cited by examiner

*Primary Examiner* — Kristie Shingles

(74) *Attorney, Agent, or Firm* — Zilka-Kotab, PC

(57) ABSTRACT

In accordance with embodiments, there are provided mechanisms and methods for determining a rate at which an entity is polled. These mechanisms and methods for determining a rate at which an entity is polled can enable decreased overall server load, improved efficiency, an increased perception of responsiveness, etc.

21 Claims, 4 Drawing Sheets

SYSTEM, METHOD AND COMPUTER PROGRAM PRODUCT FOR DETERMINING A RATE AT WHICH AN ENTITY IS POLLED

CLAIM OF PRIORITY

This application claims the benefit of U.S. Provisional Patent Application 61/352,267, entitled "Methods and systems for social data polling with back-off based upon multiple usage in a multi-tenant database environment," by Ronald Fischer, filed Jun. 7, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data transfer, and more particularly to data polling.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems may desire to poll one or more entities for data. For example, systems desiring data from a server may poll the server to see if the data is available to be transferred to the system. Unfortunately, polling techniques have been associated with various limitations.

Just by way of example, server polling may place a heavy load onto one or more resources of the server. Additionally, systems that propagate their data from a server at a slow rate may suffer from decreased functionality. Accordingly, it is desirable to effectively balance data provider load with data availability while polling for data.

BRIEF SUMMARY

In accordance with embodiments, there are provided mechanisms and methods for determining a rate at which an entity is polled. These mechanisms and methods for determining orate at which an entity is polled can enable decreased overall server load, improved efficiency, an increased perception of responsiveness, etc.

In an embodiment and by way of example, a method for determining a rate at which an entity is polled is provided. In one embodiment, one or more actions associated with a user are monitored within a system. Additionally, a level of usage is identified for the user, based on the monitoring. Further, a rate at which an entity is polled is determined, based on the determined level of usage.

While one or more implementations and techniques are described with reference to an embodiment in which determining a rate at which an entity is polled is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e. ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for determining a rate at which an entity is polled.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for determining a rate at which an entity is polled will be described with reference to example embodiments.

Figure 1:
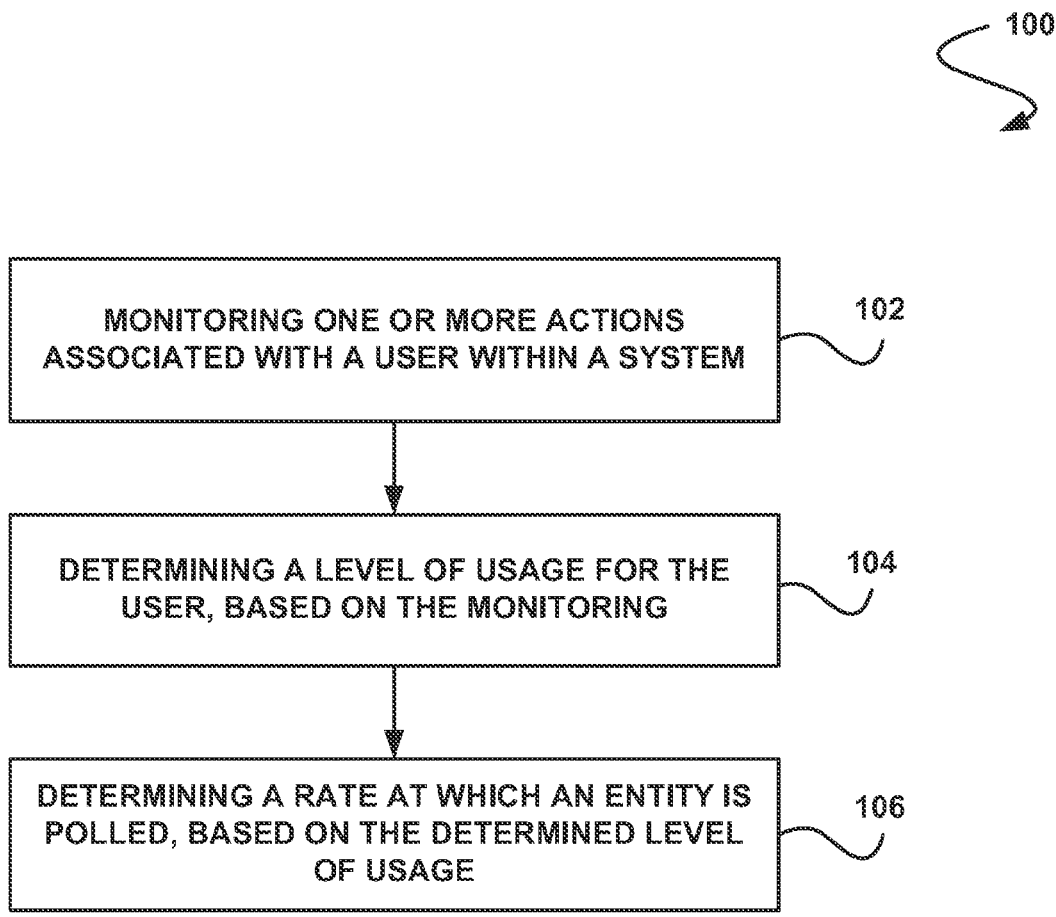
FIG. 1 illustrates a method for determining a rate at which an entity is polled, in accordance with one embodiment.

FIG. 1 illustrates a method 100 for determining a rate at which an entity is polled, in accordance with one embodiment. As shown in operation 102, one or more actions associated with a user are monitored within a system. In one embodiment, the system may include a personal computer, a handheld computer, a portable computing device (e.g., a cellular telephone, a personal digital assistant (PDA), etc. In another embodiment, the system may include an Internet browser. In yet another embodiment, the system may be in communication with another service-providing system. For example, the system may be in communication (e.g., via a communication network, etc.) with another computing device, a server, a multi-tenant on-demand database system, etc.

Additionally, in one embodiment, the user may include a client of the service-providing system. For example, the user may be a member of an organization found within the service-providing system. In another embodiment, the user may include an individual, a group of individuals, etc. In yet another embodiment, the actions of the user may be monitored utilizing one or more hardware or software elements of the system. For example, the actions of the user may be monitored using action detection technology within a runtime environment (e.g., Adobe AIR®, etc.) of the system. In another example, the actions of the user may be monitored using a software program installed on the system (e.g., a social communication program such as a messaging program, an email message program, a web-based communication program, etc.).

Further, in one embodiment, the one or more actions associated with the user that are monitored may include physical input from the user to the system. For example, the one or more actions associated with the user may include the user's input within a graphical user interface (GUI) of the system utilizing a mouse, touchpad, gesture, or other input means. In another example, the one or more actions associated with the user may include the user's input of data to the system utilizing a keyboard or other input device.

In another embodiment, the one or more actions associated with the user may include the interaction of the user with one or more software programs installed on the system. For example, the one or more actions associated with the user may include one or more of the user's selection of and interaction with one or more features of a social communication program (e.g., social system, etc.) of the system. For instance, the one or more actions may include one or more of the user requesting data from a server utilizing a software program, updating a status within the software program, sending data (e.g., a message, etc.) utilizing the software program, etc. In yet another embodiment, the one or more actions associated with the user may include the receipt of data by the user within the system. For example, the user may receive one or more messages (e.g., electronic mail messages, message service messages, social messages, etc.) within a software program installed on the system.

Further still, in one embodiment, the one or more actions associated with the user may include the user altering a state of a software program within the system. For example, the one or more actions may include one or more of the user minimizing a software program within the system, maximizing a software program within the system, closing a software program within the system, etc. In another example, the one or more actions associated with the user may include the user shutting down an operating system of the system, starting up an operating system of the system, etc. In another embodiment, monitoring the one or more actions associated with the user may include detecting such actions within the system. In yet another embodiment, the one or more actions of the user may be constantly monitored while the system is powered on, while a particular software program is running on the system, while the user is logged into the system, etc.

Further still, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, a level of usage is determined for the user, based on the monitoring. In one embodiment, the level of usage may correspond to a state of the user within the system. For example, the level of usage may indicate that the user is currently not using the system (e.g., is logged out of the system, etc.). In another example, the level of usage may indicate that the user is currently using the system but is not using a particular software program installed within the system.

In yet another example, the level of usage may indicate that the user is currently using the system and is using a particular software program installed within the system, but is not performing a particular action within the software program (e.g., engaging in the transmission of data utilizing the software program, etc.). In still another example, the level of usage may indicate that the user is using a particular software program installed within the system and is also performing a particular action within the software program.

In addition, in one embodiment, determining the level of usage for the user may include applying one or more algorithms to the one or more actions associated with the user that are monitored within the system. In another embodiment, a time element may be used in determining the level of usage for the user. For example, the time that elapsed since the last detected user action within the system may considered when determining the level of usage for the user.

Further, as shown in operation 106, a rate at which an entity is polled is determined, based on the determined level of usage. In one embodiment, the entity may include a service-providing system external to the user's system. For example, the entity may include a pull-based data message server. In another embodiment, polling the entity may include sending a request for data to the entity. In yet another embodiment, the entity may be polled by a software program installed on the system. For example, the entity may include a message server that is sent a request by system messaging software to see if any new messages exist at the message server for the messaging software. In still another embodiment, polling the entity may be performed utilizing an application programming interface (API) of the entity.

Further still, in one embodiment, one or more heuristic algorithms may be applied to the determined level of usage in order to determine the rate at which the entity is polled. For example, the determined level of usage may be used by one or more heuristic algorithms to determine a delta value for an interval in which the entity is polled. In another embodiment, the entity may be polled at the determined rate. For example, a software program within the system may request data from the entity at the determined rate. In this way, polling the entity may be optimized, which may result in a lower entity load and improved load balancing that takes user actions into consideration. Additionally, the perceived responsiveness of the polling from the perspective of the user may be increased.

Figure 2:
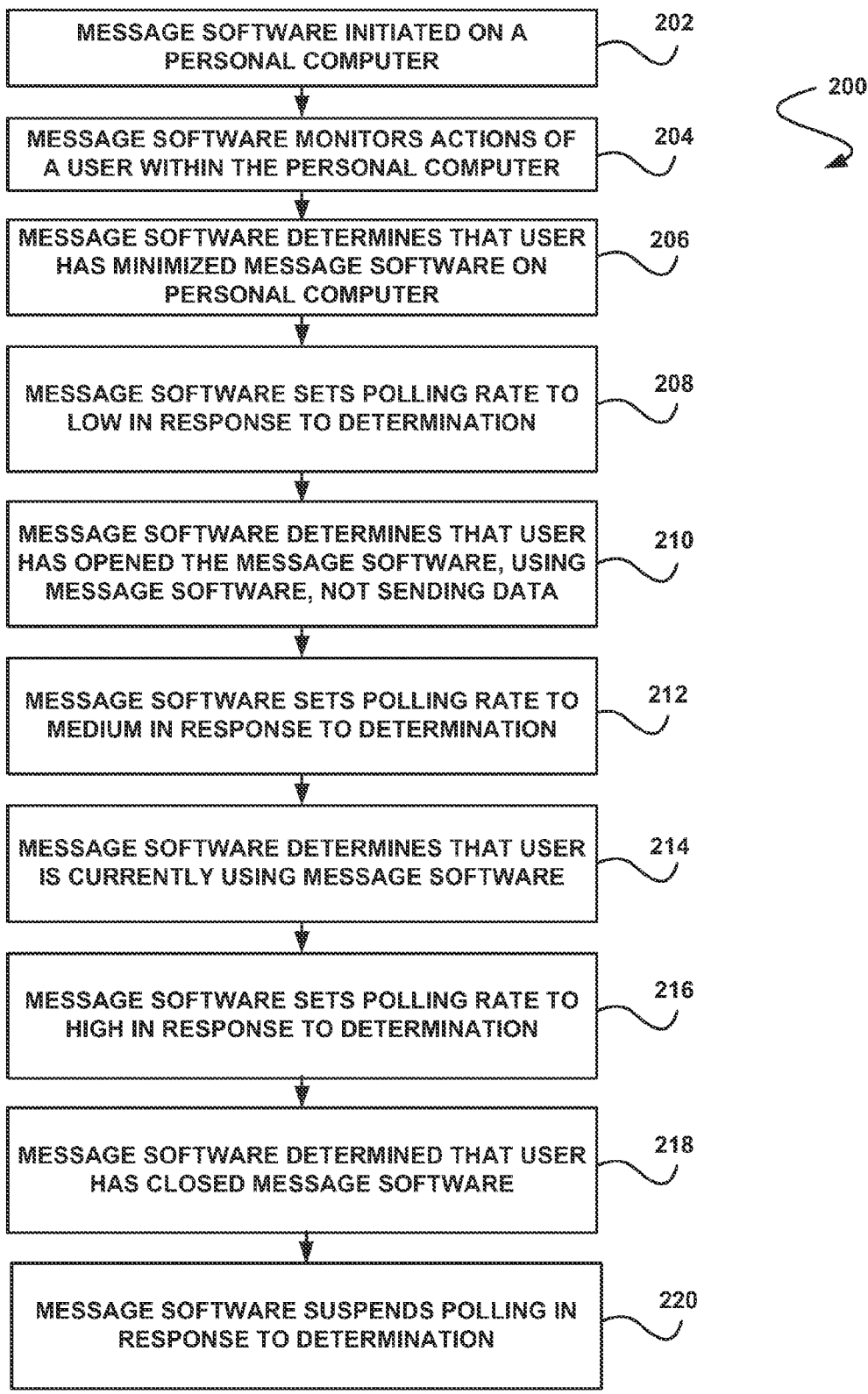
FIG. 2 illustrates method for dynamically adjusting the polling rate of message software, in accordance with another embodiment.

FIG. 2 illustrates a method 200 for dynamically adjusting the polling rate of message software, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, message software is initiated on a personal computer. In one embodiment, the message software may include a messaging client installed on the personal computer that is used to send and receive messages. In another embodiment, the message software may include an electronic mail message client installed on the personal computer that is used to send and receive electronic mail messages. In yet another embodiment, the message software may be web-based. In another embodiment, the message software may be automatically initiated upon the startup of the personal computer. In still another embodiment, the message software may be initiated by a user of the personal computer. Of course, however, the message software may be initiated in any manner.

Additionally, as shown in operation 204, the message software monitors actions of a user within the personal computer. For example, the message software may communicate with action detection technology within a runtime environment of the personal computer. Further, as shown in operation 206, the message software determines that a user has minimized the message software on the personal computer. For example, the message software may determine that the user has selected an option within the graphical user interface of the personal computer that closes a main screen of the message software but keeps the message software running on the personal computer.

Further still, as shown in operation 208, the message software sets the polling rate to low in response to the determination. In one embodiment, the message software may poll a server in order to request any new messages (e.g., instant messages, electronic mail messages, message postings, etc.) that are intended for receipt by the message software. Additionally, an interval at which the server is polled by the message software may be increased or decreased in response to the determination. In another embodiment, the interval may be selected from a list of predetermined intervals corresponding to different states of the user within the personal computer, in response to the determination. In yet another embodiment, messages that are retrieved in response to the polling may be noted to the user (e.g., utilizing a pop-up informational box within the interface of the personal computer, etc.). In this way, the load to the server may be reduced when the message software is not being actively used by the user, which may ensure that minimal resources are used when a user is inactive with respect to the message software.

Also, as shown in operation 210, the message software determines that the user has opened the message software on the personal computer and is using the message software, but is not sending any data (e.g., messages, etc.) utilizing the message software. For example, the message software may determine that the user has selected an option within the graphical user interface of the personal computer that opens a main screen of the message software. In another example, mouse movement or keyboard input may indicate that the user may be actively working on the personal computer. Further, the selection and interaction with the message software features may indicate that not only is the user active on a personal computer, hut the user may also be active on the message software.

Additionally, as shown in operation 212, the message software sets the polling rate to medium in response to the determination. For example, the interval at which the server was previously polled by the message software may be increased again in response to the determination. In another embodiment, an interval associated with a "medium" polling rate may be selected from a list of predetermined intervals corresponding to different states of the user within the personal computer, in response to the determination. In this way, messages may be more quickly retrieved by the message software while the message software is being actively used by the user, which may provide the user with an increased perception of performance when the user may want data retrieved from the server more rapidly, and may ensure that a good response level may be provided when the user is active on the message software.

Furthermore, as shown in operation 214, the message software determines that the user is currently using the message software. In one embodiment, the message software may determine that the user is currently using the message software to send data. For example, the message software may determine that the user has selected an option within the user interface of the message software to send a message utilizing the message software. In another embodiment, the message software may determine that the user is browsing existing messages within the message software. Of course, however, the message software may determined that the user is currently using the message software in any manner.

Further still, as shown in operation 216, the message software sets the polling rate to high in response to the determination. For example, the interval at which the server was previously polled by the message software may be increased yet again in response to the determination. In another embodiment, an interval associated with a "high" polling rate may be selected from a list of predetermined intervals corresponding to different states of the user within the personal computer, in response to the determination. In this way, messages may be retrieved at the fastest rate provided by the message software while the message software is being actively used to send messages, when such a rate may be most utilized by the user, and may ensure that the message software may be most responsive when the user is actively using the message software.

Also, as shown in operation 218, the message software determines that the user has closed the message software. For example, the message software may determine that the user has selected an option within the user interface of the message software to close the message software. In another example, the message software may determine that the user has selected an option within the graphical user interface of the personal computer that signs the user off of the personal computer.

In addition, as shown in operation 220, the message software suspends polling in response to the determination. For example, the message software may temporarily stop polling the server until the message software is initiated. In this way, unnecessary polling may be avoided while the message software is not being utilized, which may minimize server load and network traffic. Additionally, server polling (which may place a heavy load onto a server's application programming interface (API), internal resources, etc) may be dynamically balanced with social systems that may have maximum interactivity and utility when they rapidly expose new data. Further, as message software usage varies between levels, a back-off mechanism may ensure a gradual transition in the server polling (and thus the system responsiveness). Further still, when usage level indicators change, the polling strategy may rapidly change to adjust, which may result in perceived responsiveness with less server load.

Further, in another embodiment, during the monitoring, the message software may determine the receipt of new social messages specifically targeted at the user, which may be an indication that the user may soon become more active. In yet another embodiment, the message software may determine the receipt of a new broadcast or group social messages, which may be a weak indication that the user may soon become more active. In still another embodiment, a time difference between the actions described above may be an indication of the rate of usage of the message software.

Further still, in one embodiment, usage level indicators identified by the monitoring may be used by one or more heuristic algorithms to determine a delta in the polling interval. The delta may change based upon the indicators and elapsed time. Table 1 illustrates sample multipliers that may be used in determining poll values. Of course, it should be noted that the sample multipliers shown in Table 1 are set forth for illustrative purposes only, and thus should not be construed as limiting in any manner. In one embodiment, the lowest appropriate poll value may be used to produce the highest perceived responsiveness. In another embodiment some jitter may be introduced into the poll times to make it very unlikely that large numbers of computers may end up in lock-step on their polling.

TABLE 1

As the user actively uses the software the poll time may be some reasonably small value d.
As the user stops using the software but continues to use the computer the poll time may increase to a value 4 * d.
While the user is active on the computer, if a direct message is received by the software the poll time may be decreased to 2 * d.
While the user is active on the dev computer ice, if a broadcast message is received by the software the poll time may be decreased to 3 * d.
If the user is not active on the computer the poll time should increase to 10 * d.
It may be desirable to completely stop polling if the user has been inactive for a large amount of time.

System Overview

Figure 3:
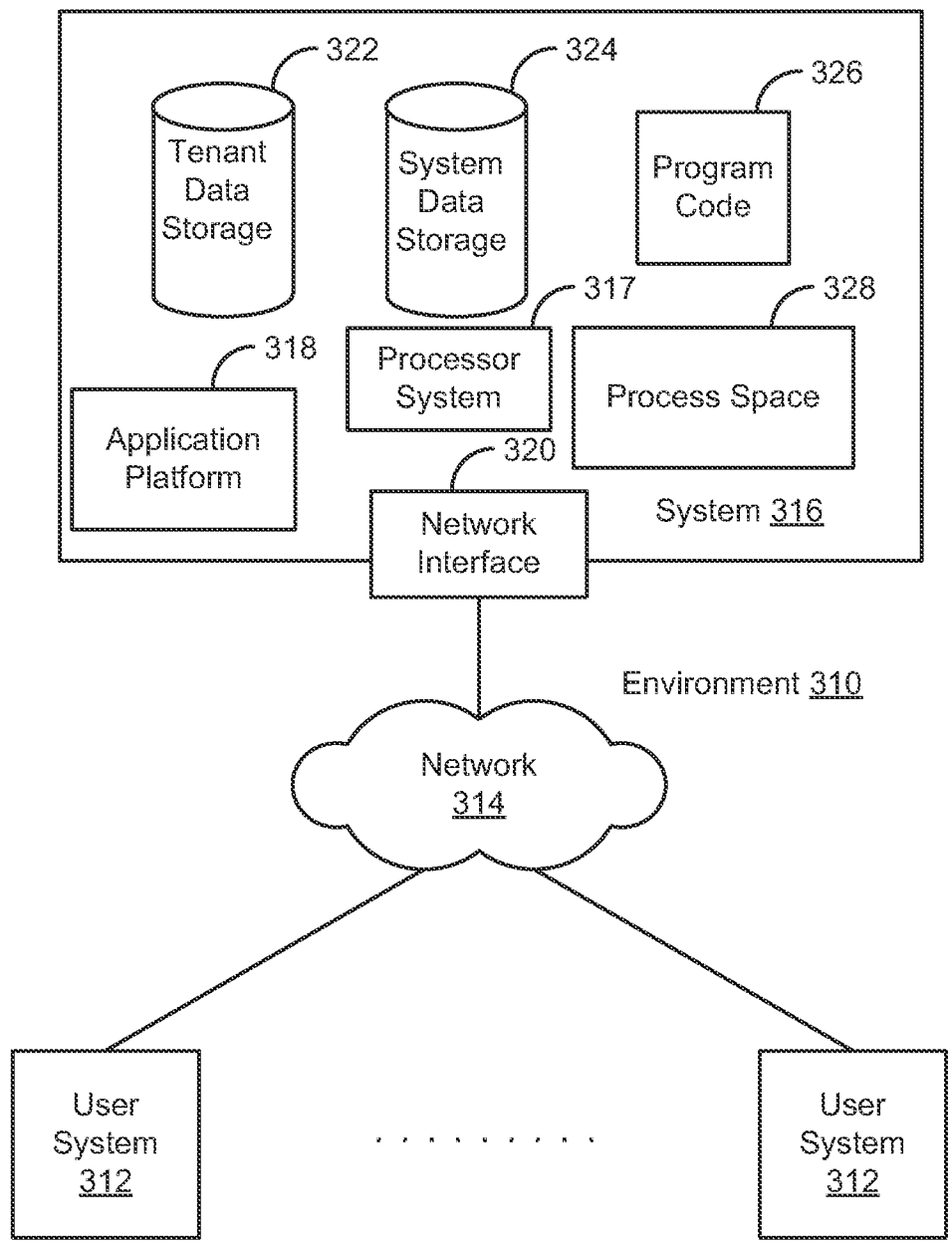
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein, A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
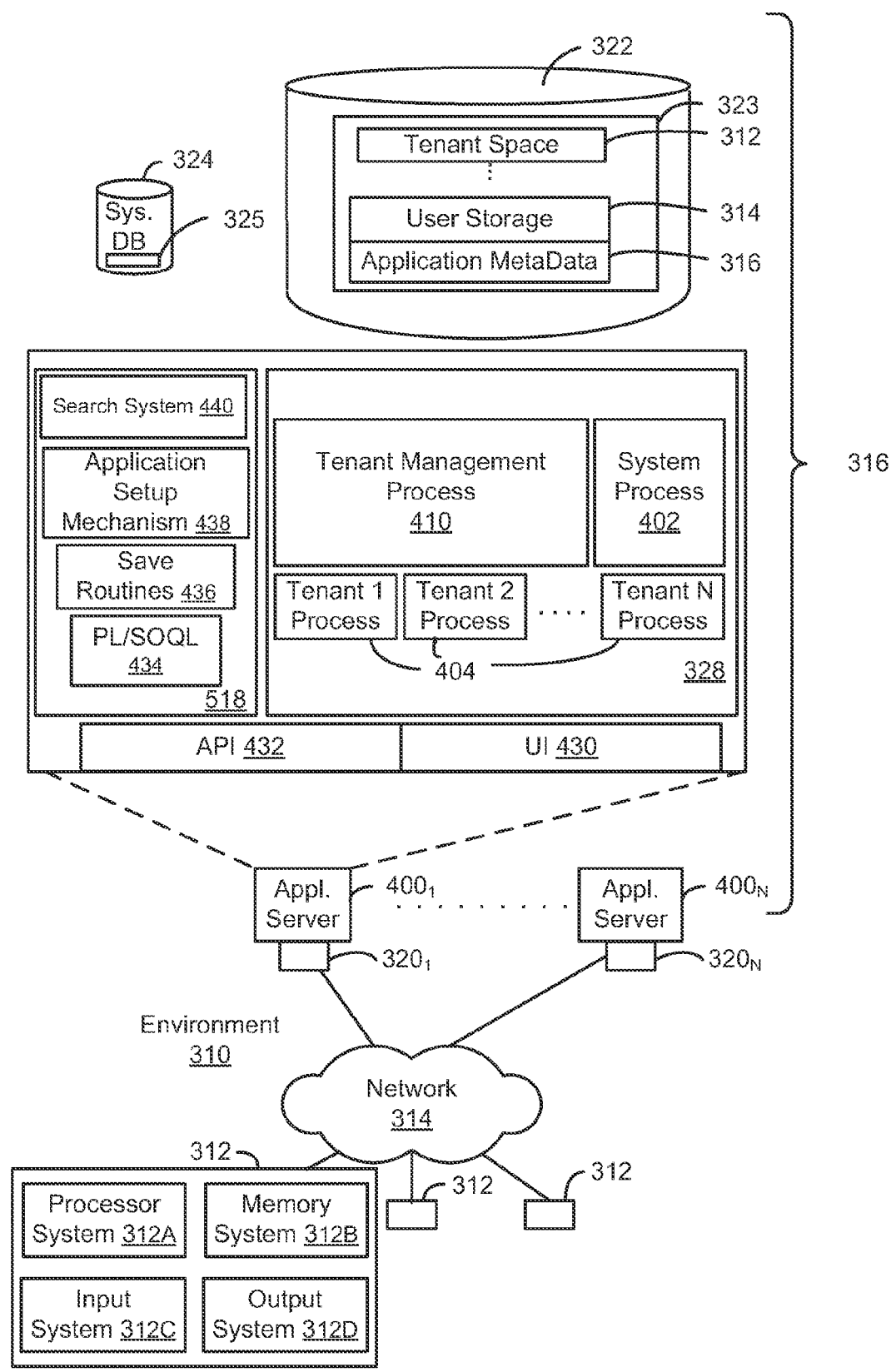
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact. Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for determining a rate at which an entity is polled, the method comprising:

monitoring one or more actions associated with a user within a system;

determining a level of usage for the user within the system, based on the monitoring, where the level of usage is determined from a plurality of levels of usage each having an associated multiplier value, and where the plurality of levels of usage include a plurality of levels of active system usage and a plurality of levels of inactivity; and determining a rate at which an entity is polled, based on the determined level of usage and its associated multiplier value, where the determining includes applying one or more heuristic algorithms to the determined level of usage.

2. The computer program product of claim 1, wherein the system includes a personal computer.

3. The computer program product of claim 1, wherein the system is in communication with another service-providing system.

4. The computer program product of claim 3, wherein the user is a member of an organization found within the service-providing system.

5. The computer program product of claim 1, wherein the actions of the user are monitored within a runtime environment of the system.

6. The computer program product of claim 1, wherein the actions of the user are monitored using a software program installed on the system.

7. The computer program product of claim 1, wherein the one or more actions associated with the user that are monitored include physical input from the user to the system.

8. The computer program product of claim 1, wherein the one or more actions associated with the user include an interaction of the user with one or more software programs installed on the system.

9. The computer program product of claim 1, wherein the one or more actions associated with the user include one or more of the user's selection of and interaction with one or more features of a social communication program of the system.

10. The computer program product of claim 1, wherein the one or more actions include one or more of the user requesting data from a server utilizing a software program, updating a status within the software program, and sending data utilizing the software program.

11. The computer program product of claim 1, wherein the one or more actions associated with the user include the receipt, of data by the user within the system.

12. The computer program product of claim 1, wherein the one or more actions associated with the user include the user altering a state of a software program within the system.

13. The computer program product of claim 12, wherein the one or more actions include one or more of the user minimizing the software program within the system, maximizing the software program within the system, and closing the software program within the system.

14. The computer program product of claim 1, wherein the level of usage indicates that the user is currently not using the system.

15. The computer program product of claim 1, wherein the level of usage indicates that the user is currently using the system but is not using a particular software program installed within the system.

16. The computer program product of claim 1, wherein the level of usage indicates that the user is currently using the system and is using a particular software program installed within the system, hut is not performing a particular action within the software program.

17. The computer program product of claim 1, wherein the level of usage indicates that the user is using a particular software program installed within the system and is also performing a particular action within the software program.

18. A method, comprising:
monitoring one or more actions associated with a user within a system;
determining a level of usage for the user within the system, based on the monitoring, where the level of usage is determined from a plurality of levels of usage each having an associated multiplier value, and where the plurality of levels of usage include a plurality of levels of active system usage and a plurality of levels of inactivity; and
determining a rate at which an entity is polled, based on the determined level of usage and its associated multiplier value, where the determining includes applying one or more heuristic algorithms to the determined level of usage.

19. An apparatus, comprising:
a processor for:
monitoring one or more actions associated with a user within a system;
determining a level of usage for the user within the system, based on the monitoring, where the level of usage is determined from a plurality of levels of usage each having an associated multiplier value, and where the plurality of levels of usage include a plurality of levels of active system usage and a plurality of levels of inactivity; and
determining a rate at which an entity is polled, based on the determined level of usage and its associated multiplier value, where the determining includes applying one or more heuristic algorithms to the determined level of usage.

20. A method for transmitting code for use in a multi-tenant database system on a transmission medium, the method comprising:
transmitting code for monitoring one or more actions associated with a user within a system, utilizing a processor;
transmitting code for determining a level of usage for the user within the system, based on the monitoring, where the level of usage is determined from a plurality of levels of usage each having an associated multiplier value, and where the plurality of levels of usage include a plurality of levels of active system usage and a plurality of levels of inactivity; and
transmitting code for determining a rate at which an entity is polled, based on the determined level of usage and its associated multiplier value, where the determining includes applying one or more heuristic algorithms to the determined level of usage.

21. The computer program product of claim 1, wherein the level of usage indicates that the user has selected an option within a graphical user interface of the system that closes a main screen of a software program on the system but keeps the software program running on the system.

\* \* \* \* \*

UNITED STATES PATENT AND TRADEMARK OFFICE
CERTIFICATE OF CORRECTION

PATENT NO.         : 8,589,540 B2                                            Page 1 of 1
APPLICATION NO.    : 13/102995
DATED              : November 19, 2013
INVENTOR(S)        : Ronald F. Fischer It is certified that error appears in the above-identified patent and that said Letters Patent is hereby corrected as shown below:

In the claims:
in claim 11, col. 14, line 47; replace "receipt, of" with --receipt of--;
in claim 16, col. 14, line 66; replace "hut" with --but--.

Signed and Sealed this
Second Day of September, 2014

Michelle K. Lee
*Deputy Director of the United States Patent and Trademark Office*